United States Patent
Hayashi et al.

(10) Patent No.: US 8,506,167 B2
(45) Date of Patent: Aug. 13, 2013

(54) DYNAMIC BEARING DEVICE HAVING A THRUST BEARING PORTION

(75) Inventors: Tatsuya Hayashi, Kuwana (JP); Tatsuo Kawase, Kuwana (JP); Kiyotaka Kusunoki, Kuwana (JP); Isao Komori, Kuwana (JP); Katsuo Shibahara, Kuwana (JP)

(73) Assignee: NTN Corporation, Osaka-fu (JP)

( * ) Notice: Subject to any disclaimer, the term of this patent is extended or adjusted under 35 U.S.C. 154(b) by 273 days.

(21) Appl. No.: 10/590,910

(22) PCT Filed: Mar. 17, 2005

(86) PCT No.: PCT/JP2005/004772
§ 371 (c)(1),
(2), (4) Date: May 3, 2007

(87) PCT Pub. No.: WO2005/098250
PCT Pub. Date: Oct. 20, 2005

(65) Prior Publication Data
US 2008/0037916 A1 Feb. 14, 2008

(30) Foreign Application Priority Data

Mar. 30, 2004 (JP) .................. 2004-100032
May 19, 2004 (JP) .................. 2004-149583

(51) Int. Cl.
*F16C 32/06* (2006.01)
(52) U.S. Cl.
USPC .................. 384/107; 384/121
(58) Field of Classification Search
USPC .......... 384/107, 121, 110, 112, 123, 113; 310/90; 360/99.08, 99.09
See application file for complete search history.

(56) References Cited

U.S. PATENT DOCUMENTS

| | | | | |
|---|---|---|---|---|
| 5,106,204 A | * | 4/1992 | Dunham | 384/12 |
| 5,599,108 A | * | 2/1997 | Ochiai et al. | 384/123 |
| 5,659,445 A | * | 8/1997 | Yoshida et al. | 360/98.07 |
| 5,973,878 A | * | 10/1999 | Yoshida et al. | 360/98.07 |
| 5,988,887 A | * | 11/1999 | Lee | 384/107 |
| 6,020,664 A | * | 2/2000 | Liu et al. | 310/90 |
| 6,435,721 B1 | * | 8/2002 | Inoue et al. | 384/123 |

(Continued)

FOREIGN PATENT DOCUMENTS

| | | |
|---|---|---|
| JP | 2-186117 | 7/1990 |
| JP | 2-278007 | 11/1990 |

(Continued)

OTHER PUBLICATIONS

Korean Office Action issued Nov. 25, 2011 in corresponding Korean Application No. 2006-7020005.

*Primary Examiner* — Alan Waits
(74) *Attorney, Agent, or Firm* — Wenderoth, Lind & Ponack, L.L.P.

(57) ABSTRACT

The present invention has an object of improving wear resistance of a thrust bearing portion. A pressure is generated by a dynamic pressure effect of a lubricating oil in a thrust bearing gap between a thrust bearing surface including dynamic pressure generating grooves and a smooth thrust receiving surface so as to rotatably support a shaft member in an axial direction. The thrust receiving surface is formed as a flat surface, whereas an inclined plane is provided on the thrust bearing surface so as to provide a reduced portion having a decreasing axial width in a radially outward direction in the thrust bearing gap.

9 Claims, 5 Drawing Sheets

(56) References Cited

U.S. PATENT DOCUMENTS

| | | |
|---|---|---|
| 2001/0022869 A1 * | 9/2001 | Tanaka et al. ............... 384/100 |
| 2001/0022870 A1 | 9/2001 | Takahashi et al. |
| 2002/0172438 A1 | 11/2002 | Nakagawa et al. |

FOREIGN PATENT DOCUMENTS

| | | |
|---|---|---|
| JP | 6-315241 | 11/1994 |
| JP | 7-332353 | 12/1995 |
| JP | 07332353 A * | 12/1995 |
| JP | 10-131955 | 5/1998 |
| JP | 10/269691 | 10/1998 |
| JP | 2001-32828 | 2/2001 |
| JP | 2001-221232 | 8/2001 |
| JP | 2001-254727 | 9/2001 |
| JP | 2002-061637 | 2/2002 |
| JP | 2002-286026 | 10/2002 |
| JP | 2002-339957 | 11/2002 |
| JP | 2003-028162 | 1/2003 |
| JP | 2003-184868 | 7/2003 |
| JP | 2004-324684 | 11/2004 |

* cited by examiner

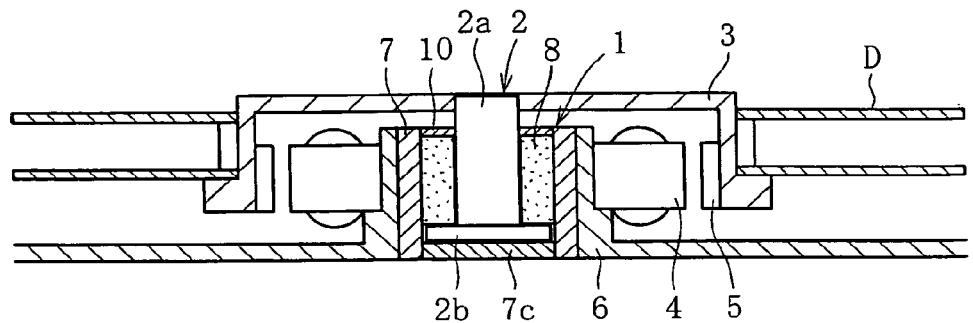

DYNAMIC BEARING DEVICE HAVING A THRUST BEARING PORTION

BACKGROUND OF THE INVENTION

I. Technical Field

The present invention relates to a dynamic bearing device. This bearing device is suitable for: a spindle motor for information equipment, for example, a magnetic disk device such as an HDD or an FDD, an optical disk device for a CD-ROM, a DVD-ROM or the like, and a magneto-optical disk device for an MD, an MO or the like; a polygon scanner motor for a laser beam printer (LBP); and a small motor for electric equipment, for example, an axial fan and the like.

II. Description of Related Art

The above-mentioned various motors are required to operate not only with high rotational accuracy but also at higher speed, lower cost, and lower noise. One of the components determining the required performance is a bearing for supporting a spindle of the motor. As this type of bearing, a dynamic bearing device having characteristics excellent in the above-mentioned required performance has been considered for use or has been put into practical use in recent years.

As an example of the dynamic bearing device, Japanese Patent Laid-Open Publication No. 2002-61641 discloses a dynamic bearing device having the following structure. The dynamic bearing device includes: a cylindrical housing with a closed end; a bearing member fixed to an inner periphery of the housing; a shaft member inserted onto an inner peripheral face of the bearing member; and a radial bearing portion and a thrust bearing portion, which rotatably support the shaft member in a non-contact manner by a dynamic pressure effect generated during the relative rotation of the shaft member and a bearing sleeve.

Of the radial bearing portion and the thrust bearing portion, the thrust bearing portion generates a pressure by a dynamic pressure effect of oil in each of thrust bearing gaps between both end faces of a flange of the shaft member and a bottom face of the housing and an end face of the bearing sleeve, which are opposed thereto, so as to support the shaft member in an axial direction in a non-contact manner.

In this type of dynamic bearing device, a member on the rotational side and a member on the fixed side inevitably slide with each other at high speed when the dynamic bearing device starts and stops operating. Therefore, in the dynamic bearing device used for information equipment in which the operation of a motor is frequently started and stopped, for example, consumer equipment including an HDD-DVD recorder and a storage device for a cell-phone, the wear of a sliding face caused by repeated start and stop of the operation emerges as a problem under some conditions for use and the like. Thus, wear resistance is desired to be further improved. In particular, in the case where the flange is made of a resin, wear is more likely to be accelerated as compared with the case where metals slide with each other. Accordingly, there is a possibility that bearing performance may be degraded within a short period of time due to the effect of abrasion powder.

SUMMARY OF THE INVENTION

In view of the above problems, the present invention has an object of providing a dynamic bearing device capable of preventing wear of a thrust bearing portion.

In order to achieve the above object, a dynamic bearing device according to the present invention comprises: a fixed-side member; a rotational-side member; a thrust bearing surface formed on any one of the fixed-side member and the rotational-side member, the thrust bearing surface including a dynamic pressure generating groove area having a plurality of dynamic pressure generating grooves being arranged thereon; a thrust receiving surface provided on the other one of the fixed-side member and the rotational-side member so as to be opposed to the thrust bearing surface in an axial direction; and a thrust bearing gap formed between the thrust bearing surface and the thrust receiving surface, the thrust bearing gap being for generating a pressure by a dynamic pressure effect of a fluid during rotation of the rotational-side member so as to support a rotary member in an axial direction in a non-contact manner by the pressure, wherein a reduced portion having an axial width decreasing in a radially outward direction is provided in the thrust bearing gap; the plurality of dynamic pressure generating grooves are provided so as to face the reduced portion; and pumping power of the dynamic pressure generating grooves is maximized in a radially outermost portion of the reduced portion.

With this structure, the radially outermost portion of the reduced portion having a high peripheral speed has the minimum width and pumping power of the dynamic pressure generating grooves is maximized in the portion. Therefore, a contact start rotational speed can be lowered. As a result, contact time between the thrust bearing surface and the thrust receiving surface at the start or the stop of operation of a motor can be reduced.

The thrust bearing gap can be obtained by forming at least one of the thrust bearing surface and the thrust receiving surface of the reduced portion as an inclined plane.

Furthermore, in order to achieve the above object, a dynamic bearing device according to the present invention comprises: a shaft member having a shaft portion and a flange portion; and a thrust bearing portion for generating a pressure by a dynamic pressure effect of a fluid in a thrust bearing gap between an end face of the flange portion and a face being opposed thereto so as to support the shaft member in an axial direction in a non-contact manner by the pressure, wherein the end face of the flange portion facing the thrust bearing gap is formed of a resin and at least a part of the end face facing the thrust bearing gap is formed as an inclined plane coming closer to an opposed face in a radially outward direction. As a result, the radially outermost portion of the part of the end face of the flange portion, which faces the thrust bearing gap, has the minimum width of the thrust bearing gap. The highest peripheral speed can be obtained at this portion in the thrust bearing gap. Since the pumping power by dynamic pressure generating means such as dynamic pressure generating grooves is enhanced in this minimum width portion in this case, contact time between the thrust bearing surface and the thrust receiving surface at the start or the stop of operation of the motor can be reduced. As a result, wear of the thrust bearing portion can be prevented. The inclined plane may be formed not only as a flat tapered surface but also as a curved face.

The inclined plane on the end face of the flange portion may be formed by making use of a level difference of a sink generated when a resin part of the shaft member is hardened. For example, if a radially inner side of the end face of the flange portion, which faces the thrust bearing gap, is made of a thick resin while a radially outer side thereof is made of a thinner (a difference between thick and thin is defined by an axial thickness) resin than the thick resin, an amount of sink in the axial direction becomes large on the radially inner side as compared with that on the radially outer side when the resin is hardened. Therefore, the inclined plane can be provided on the end face of the flange portion by making use of a difference in the amount of sink.

The shaft member includes: an outer shaft portion forming an outer peripheral face of the shaft portion; and an inner shaft portion provided on an inner periphery of the outer shaft portion, the outer shaft portion is formed of a metal, and the inner shaft portion and the flange portion are integrally formed of a resin. With such a structure, the radially inner side of the flange portion is made of a resin having a larger thickness than that of the radially outer side by the presence of the inner shaft portion. Therefore, a difference is generated in the amount of sink between on the radially inner side and on the radially outer side of the flange portion. As a result, the inclined plane can be formed on the end face of the flange portion.

In the above-described structure, it is desirable to set a ratio: $h/r \leq 0.01$ where a length of the inclined plane in a radial direction is r and a height of the inclined plane is h so as to prevent the dynamic pressure effect from getting worse or the like.

A motor including: the above-described dynamic bearing device; a rotor magnet attached to the rotational-side member; and a stator coil attached to the fixed-side member has high durability as well as high rotational accuracy. Therefore, the motor is suitable as a motor for information equipment.

As is apparent from the above description, since wear of the thrust bearing portion can be prevented according to the present invention, the durability of the dynamic bearing device can be improved.

BRIEF DESCRIPTION OF THE DRAWINGS

FIG. 1 is a cross-sectional view of a spindle motor using a dynamic bearing device according to the present invention;

FIG. 2 is a cross-sectional view of the dynamic bearing device;

DETAILED DESCRIPTION OF THE INVENTION

Figure 3:
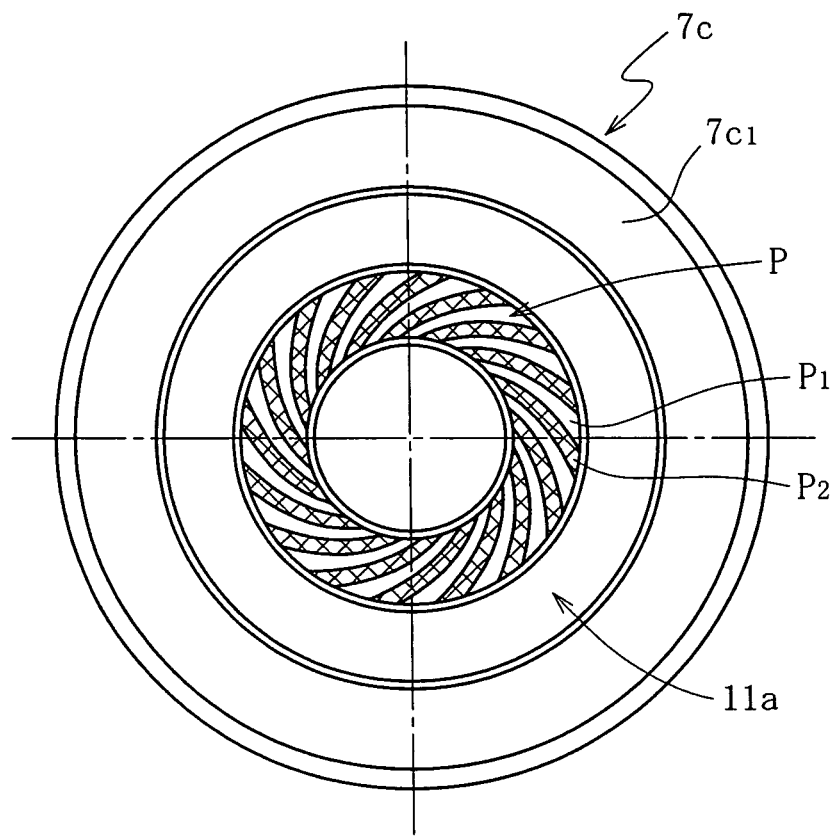
FIG. 3 is a plan view of a thrust bearing surface (an upper end face of a thrust plate)

Hereinafter, embodiments of the present invention will be described.

FIG. 1 shows a spindle motor used for a disk drive device such as an HDD as an example of a spindle motor for information equipment incorporating a dynamic bearing device 1. The motor includes: the dynamic bearing device 1; a rotational member 3 (a disk hub) attached to a shaft member 2 of the dynamic bearing device 1; a stator coil 4 and a rotor magnet 5 provided so as to be opposed to each other, for example, through a radial gap; and a bracket 6. The stator coil 4 is attached to an outer periphery of the bracket 6. The rotor magnet 5 is attached to an inner periphery of the disk hub 3.

The disk hub 3 retains one or a plurality of disks D such as a magnetic disk on its outer periphery. A housing 7 of the dynamic bearing device 1 is attached to an inner periphery of the bracket 6. When the stator coil 4 is energized, the rotor magnet 5 is rotated by an excitation force generated between the stator coil 4 and the rotor magnet 5. With the rotation of the rotator magnet 5, the disk hub 3 rotates, which in turn rotates the shaft member 2.

FIG. 2 shows an example of the dynamic bearing device 1 described above. The dynamic bearing device 1 includes: radial bearing portions R1 and R2 for supporting the shaft member 2 in a radial direction; and thrust bearing portions T1 and T2 for supporting the shaft member 2 in an axial direction. Each of the radial bearing portions R1 and R2 and the thrust bearing portions T1 and T2 is constituted by a dynamic pressure bearing. The dynamic pressure bearing forms a bearing surface including dynamic pressure generating grooves on any one of a rotational-side member and a fixed-side member while forming a smooth receiving surface on the other member so as to be opposed to the bearing surface. During rotation of the rotational-side member, a pressure is generated by a dynamic pressure effect of a fluid in a bearing gap between the bearing surface and the receiving surface to rotatably support the rotational-side member in a non-contact manner.

Hereinafter, a specific structure of the dynamic bearing device 1 will be described.

As shown in FIG. 2, the dynamic bearing device 1 according to this embodiment includes as principle bearing components: the cylindrical housing 7 having a closed end and an opening 7*a* on the other end; a cylindrical bearing sleeve 8 fixed onto an inner peripheral face of the housing 7; the shaft member 2; and a sealing member 10 fixed into the opening 7*a* of the housing 7. For convenience of description, the opening side of the housing 7 is referred to as an upper side while the opposite side in the axial direction is referred to as a lower side in the following description.

The housing 7 is formed in a cylindrical shape with a closed end, including a cylindrical side portion 7*b* and a bottom portion 7*c*. In this embodiment, the bottom portion 7*c* is formed by a disc-like thin thrust plate as a member independent of the side portion 7*b*. The thrust plate 7*c* is bonded to and/or pressed into a lower opening of the side portion 7*b* so as to be attached thereto, thereby forming the housing 7 having a closed end. The bottom portion 7*c* of the housing 7 may be integrally formed with the side portion 7*b*. The side portion 7*b* and the bottom portion 7*c* of the housing 7 may be formed of any one of a metal material and a resin material.

The shaft member 2 is, for example, entirely formed of a metal material such as stainless steel (SUS420J2). The shaft member 2 includes: a shaft portion 2*a*; and a flange portion 2*b* provided on a lower end of the shaft portion 2*a* so as to be extended in a radially outward direction. The shaft portion 2*a* and the flange portion 2*b* are provided integrally or independently. A lower end face 2*b*1 of the flange portion 2*b* is opposed to an upper end face 7*c*1 of the thrust plate 7*c*, whereas an upper end face 2*b*2 of the flange portion 2*b* is opposed to a lower end face 8*c* of the bearing sleeve 8. The lower end face 2*b*1 and the upper end face 2*b*2 of the flange portion 2*b* function as thrust receiving surfaces 11*b* and 13*b*, respectively, as described below.

In this embodiment, a part of the upper end face 7*c*1 of the thrust plate 7*c*, which is opposed to the lower end face 2*b*1 of the flange portion 2*b*, serves as the thrust bearing surface 11*a* of the lower thrust bearing portion T1. On a part of the thrust bearing surface 11*a*, for example, in the vicinity of the radial center of the thrust bearing surface 11*a*, a dynamic pressure generating groove area P is annularly formed is shown in FIG. 3. The dynamic pressure generating groove area P is formed by spirally arranging a plurality of dynamic pressure generating grooves P1 and a plurality of ridges P2, each forming a like-hill between the dynamic pressure generating grooves P1. Although a method of processing the dynamic pressure generating groove area P is arbitrary, press working is desirable because it allows the formation of the dynamic pressure generating groove area P at low cost with high accuracy. In this case, in order to improve the processability in press working, it is desirable to form the thrust plate 7c of a soft metal material with a small yield stress, for example, a copper alloy (such as brass, a zinc bronze, lead bronze or phosphor bronze) or aluminum (A2 to 7). Additionally, as shown in FIG. 2, thrust bearing surface 11a includes dented areas X and Y.

The bearing sleeve 8 is formed of an oil-impregnated sintered metal in a cylindrical shape. The oil-impregnated sintered metal is obtained by impregnating, for example, a porous material, in particular, a sintered metal on the basis of copper into a lubricating oil (or a lubricating grease). A radial bearing surface of the first radial bearing portion R1 and a radial bearing surface of the second radial bearing portion R2 are provided on an inner peripheral face 8a of the bearing sleeve 8 so as to be axially separated from each other. Dynamic pressure generating grooves in, for example, a herringbone pattern are formed in each of the two areas. A spiral pattern, an axial groove pattern or the like may be used as a pattern of the dynamic pressure generating grooves. The radial bearing surfaces including the dynamic pressure generating grooves may also be formed on an outer peripheral face of the shaft portion 2a of the shaft member 2. Furthermore, the bearing sleeve 8 may be formed of a material other than the porous material, for example, a soft metal such as brass or a copper alloy.

In this embodiment, the lower end face 8c of the bearing sleeve 8 serves as a thrust bearing surface 13a of the upper thrust bearing portion T2. On the thrust bearing surface 13a, an annular dynamic pressure generating groove area (not shown) where a plurality of dynamic pressure generating grooves are spirally arranged is formed.

As shown in FIG. 2, the sealing member 10 is annular and is fixed into an inner peripheral face of the opening 7a of the housing 7 by means such as pressing or bonding. In this embodiment, an inner peripheral face 10a of the sealing member 10 is formed in a cylindrical shape, and a lower end face of the sealing member 10 abuts against the upper end face 8b of the bearing sleeve 8.

The shaft portion 2a of the shaft member 2 is inserted onto the inner peripheral face 8a of the bearing sleeve B. The flange portion 2b is housed in a space between the lower end face 8c of the bearing sleeve 8 and the upper end face 7c1 of the thrust plate 7c. A tapered surface 2a of the shaft portion 2a is opposed to the inner peripheral face 10a of the sealing member 10 with a predetermined gap therebetween. As a result, a tapered sealed space S that gradually expands in the outer direction of the housing 7 (upwardly in the drawing) is formed between the tapered surface 2a and the inner peripheral face 10a. During the rotation of the shaft member 2, the tapered surface 2a1 of the shaft portion 2a also serves as a so-called centrifugal seal. An internal space in the housing 7 (including pores in the bearing member 8) sealed by the sealing member 10 is filled with a lubricating oil. An oil level of the lubricating oil is present in the sealed space S. The sealed space S is formed not only in a tapered shape as described above but also in a cylindrical shape having the same diameter in the axial direction.

During the rotation of the motor, the shaft member 2 serves as a rotational-side member, whereas the housing 7, the bearing sleeve 8 and the sealing member 10 serve as fixed-side members in the above-described embodiment. When the shaft member 2 is rotated by motor rotation, a pressure is generated by a dynamic pressure effect of the lubricating oil in a radial bearing gap between the radial bearing surface on the inner peripheral face of the bearing sleeve 8 and the outer peripheral face of the shaft portion 2a (the radial receiving surface) being opposed thereto in the radial bearing portions R1 and R2. As a result, the shaft portion 2a of the shaft member 2 is supported so as to be rotatable in the radial direction in a non-contact manner. Moreover, in the lower thrust bearing portion T1, a pressure is generated by a dynamic pressure effect of the lubricating oil in the thrust bearing gap between the dynamic pressure generating groove area P formed on the upper end face 7c1 (the thrust bearing surface 11a) of the thrust plate 7c and the lower end face 2b1 (the thrust receiving surface 11b) of the flange portion 2b being opposed thereto. At the same time, in the upper thrust bearing portion T2, a pressure is generated by a dynamic pressure effect of the lubricating oil in a thrust bearing gap between the dynamic pressure generating groove area (not shown) formed on the lower end face 8c (the thrust bearing surface 13a) of the bearing sleeve 8 and the upper end face 2b2 (the thrust receiving surface 13b) of the flange portion 2b being opposed thereto. Therefore, the flange portion 2b of the shaft member 2 is supported so as to be rotatable in the axial direction in a non-contact manner.

Although the thrust bearing surface 11a including the dynamic pressure generating groove area P and the thrust bearing surface 13a including the dynamic pressure generating groove area not shown are formed on the upper end face 7c1 of the thrust plate 7c and the lower end face 8c of the bearing sleeve 8, respectively, in the above-described embodiment, the thrust bearing surfaces 11a and 13a may also be formed on any one of or both of the end faces 2b1 and 2b2 of the flange portion 2b. In this case, the smooth thrust receiving surface lib or 13b without a dynamic pressure generating groove is formed on the upper end face 7c1 of the thrust plate 7c or the lower end face 8c of the bearing sleeve 8.

Figure 4:
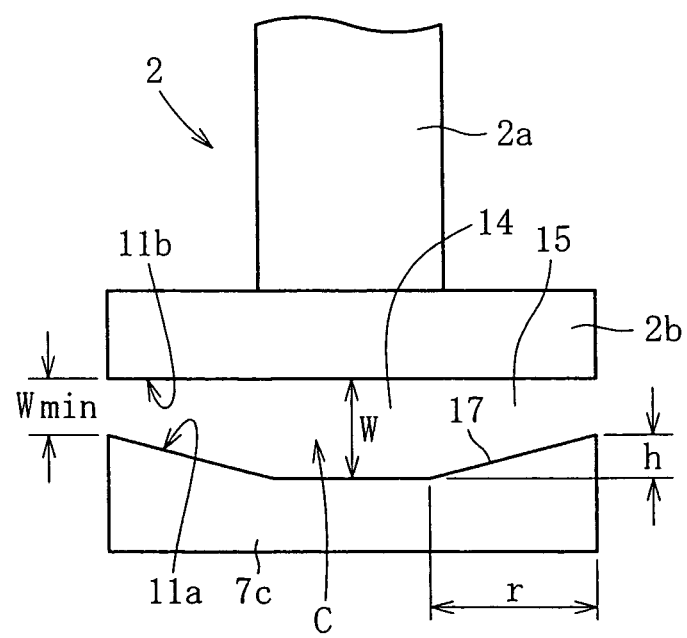
FIG. 4 is an enlarged sectional view schematically showing a lower thrust bearing portion.

In the present invention, as shown in FIG. 4, a reduced portion 15 formed by gradually reducing an axial width W in the radially outward direction is formed in the thrust bearing gap C of the lower thrust bearing portion T1 (a width of the thrust bearing gap C is illustrated in an exaggerated manner in FIG. 4). FIG. 4 shows an embodiment where a uniform portion 14 having a constant width is provided as a radially inner part of the thrust bearing gap C and the reduced portion 15 is provided on the radially outer side thereof. The reduced portion 15 can be formed by, as shown in the drawing for example, forming the thrust receiving face 11b as a flat plane in a direction perpendicularly crossing the axial direction and providing an inclined plane 17 coming closer to the thrust receiving surface 11b in the radially outward direction on the thrust bearing surface 11a. The dynamic pressure generating groove area P of the thrust bearing surface 11a is provided on the inclined plane 17.

By forming the reduced portion 15 in the thrust bearing gap C as described above, a radially outermost portion of the reduced portion 15 corresponds to the minimum width portion Wmin of the thrust bearing gap C. Since a peripheral speed at the radially outermost portion of the reduced portion is high during the rotation of the shaft member 2, pumping power of the dynamic pressure generating grooves P1 in this portion becomes high. The pumping power of the dynamic pressure generating grooves P1 depends not only on the peripheral speed but also on a depth or a width of the dynamic pressure generating grooves; the pumping power is generally enhanced as the depth or the width of the dynamic pressure generating grooves increases. In the present invention, however, the groove depth is set constant and the groove width is slightly increased in the radially outward direction as shown in FIG. 3 so as to enhance the pumping power of the spirally arranged dynamic pressure generating grooves in the radially outward direction. In this manner, the dynamic pressure generating groove area is designed so as to obtain the maximum pumping power in the radially outermost portion of the reduced portion 15.

Figure 9:
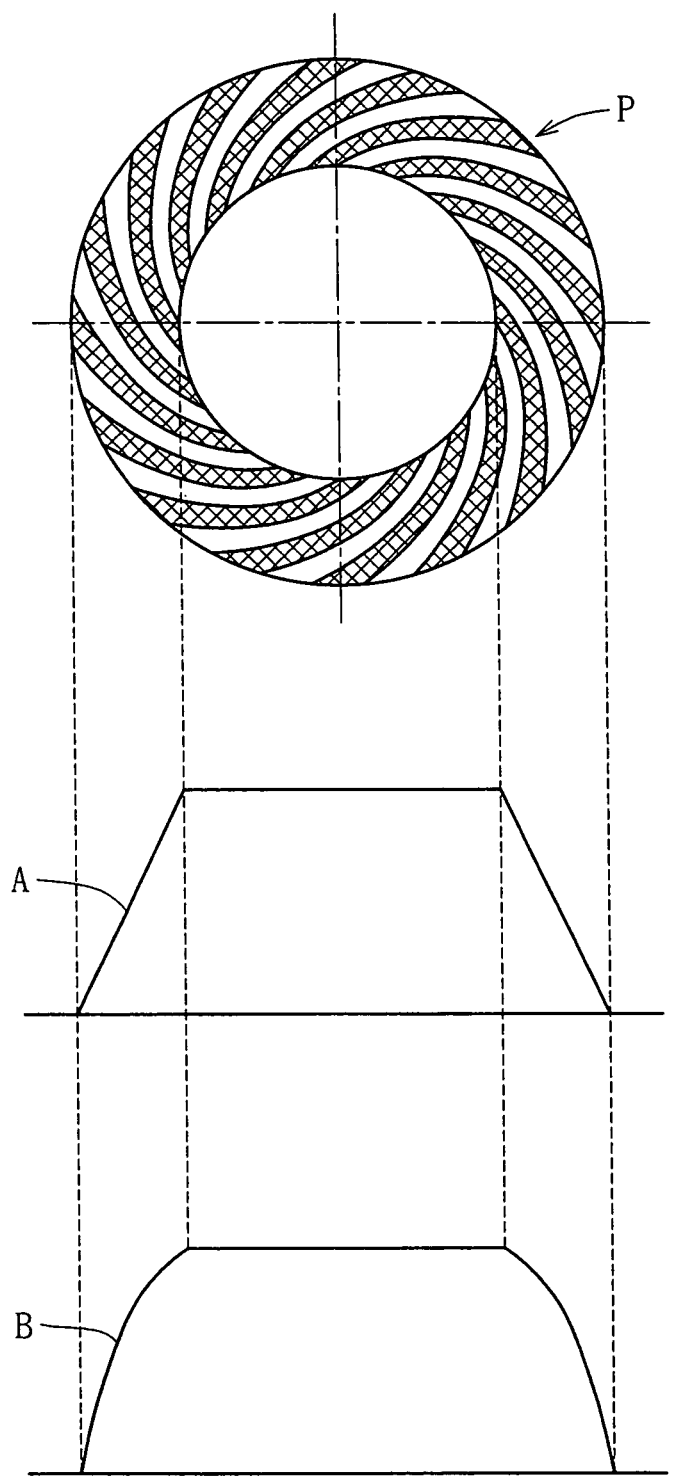
FIG. 9 shows a plan view of a dynamic pressure generating groove area of the thrust bearing portion and a pressure distribution chart in a thrust bearing gap.

The pumping power can be seen from a pressure distribution in the thrust bearing gap C. FIG. 9 shows a pressure distribution in the thrust bearing gap C in the case where the dynamic pressure generating grooves are spirally arranged as shown in the upper drawing as an example. In FIG. 9, the inclination of a line (a pressure gradient) indicating a pressure distribution in the middle and lower drawings represents the pumping power; it means that the pumping power becomes higher as the pressure gradient becomes larger. For example, if the pumping power of the dynamic pressure generating grooves is set constant in the radial direction by reducing the depth of the dynamic pressure generating grooves in the radially outward direction while the same reduced portion 15 as that according to the present invention is provided, a rise of the pressure distribution (indicated by A) is straight so that the pressure gradient becomes then constant as illustrated in the middle drawing. On the other hand, when the pumping power is enhanced in the radially outward direction as in the present invention (see the lower drawing), a rise of the pressure distribution (indicated by B) is an upwardly convex curve so that the pressure gradient becomes the maximum in the radially outermost portion of the dynamic pressure generating grooves. Therefore, the pressure distribution is noticeably different from that in the case where the pumping power is set constant. In any case, the highest pressure in the thrust bearing gap C is generated in the uniform portion 14.

As described above, since the pumping power of the dynamic pressure generating grooves is maximized in the minimum width portion of the reduced portion with the highest peripheral speed in the present invention, a large amount of oil can be fed inwardly in the radial direction even at low rotational speed. Therefore, a contact start rotational speed of the bearing device 1 can be kept low. As a result, the wear of the thrust bearing portion T1 due to sliding contact between the thrust bearing surface and the thrust receiving surface can be prevented, thereby providing the dynamic bearing device 1 suitable for use in the case where the motor operation is frequently started and stopped.

Herein, the contact start rotational speed is such a rotational speed that the thrust bearing surface 11a and the thrust receiving surface 11b come into contact with each other at a speed lower than it, whereas the surfaces 11a and 11b do not come into contact with each other at a speed higher than it. Since contact time between the thrust bearing surface 11a and the thrust receiving surface 11b immediately after the start or immediately before the stop of the operation of the motor is reduced if the contact start rotation speed is lowered, the wear of the thrust bearing portion T1 can be prevented.

Figure 6:
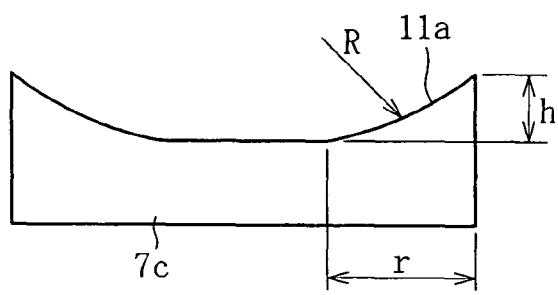
FIG. 6 is a cross-sectional view showing another example of an inclined plane.

Such effects can be obtained as long as the thrust bearing gap C has the reduced portion 15. Besides the inclined plane 17 provided on the thrust bearing surface 11a as shown in the drawing, the thrust bearing surface 11a may be formed as a flat plane, whereas an inclined plane may be provided on the thrust receiving surface 11b. Alternatively, inclined planes may be formed both on the thrust bearing face 11a and the thrust receiving face 11b. Furthermore, the inclined plane 17 may be formed not only as a tapered plane having a straight cross section as shown in FIG. 4 but also in a curved surface having a circular cross-section having a radius R (including a composite curved surface obtained by combining circles having two or more radii) as shown in FIG. 6.

Moreover, although only the case where the reduced portion 15 is provided in the thrust bearing gap C of the lower thrust bearing portion T1 is illustrated in FIG. 4, the same effects can be obtained if the same reduced portion is formed in the thrust bearing gap of the upper thrust bearing portion T2.

Figure 5:
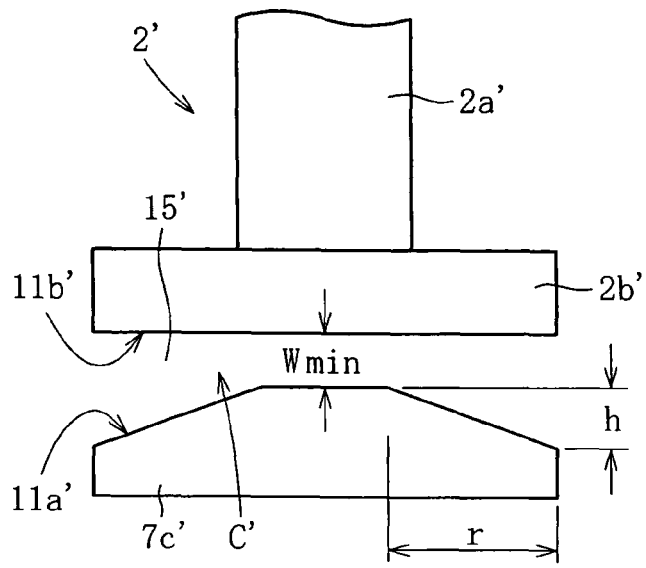
FIG. 5 is an enlarged sectional view schematically showing a comparative thrust bearing portion.

In order to confirm the above-described effects, a theoretical calculation of the contact start rotational speed is performed for the dynamic bearing device according to the present invention and a comparative dynamic bearing device. Herein, the dynamic bearing device according to the present invention includes the thrust bearing gap having the reduced portion 15 as shown in FIG. 4, whereas the comparative bearing device includes the thrust bearing gap having an expanded portion 15' having an increasing axial width in the radially outward direction as shown in FIG. 5 (in FIG. 5, the members corresponding to those shown in FIG. 4 are denoted by the reference numerals with the apostrophe (')).

The theoretical calculation is performed with reference to the following document: Jiasheng Zhu and Kyosuke Ono, 1999, "A Comparison Study on the Performance of Four Types of oil Lubricated Hydrodynamic Thrust Bearings for Hard Disk Spindles", Transactions of the ASME, Vol. 121, January 1999, pp. 114-120.

The calculation conditions (a DF method and Sommerfeld boundary conditions) used in the theoretical calculation are as follows.

| Weight of rotary part W | 6.5 g |
| Outer diameter of thrust bearing portion Do | 6.5 mm |
| Inner diameter of thrust bearing portion Di | 2.5 mm |
| Groove depth ho | 7 μm |
| Number of grooves k | 16 |
| Groove angle α | 30 degrees |
| Hill/groove ratio γ | 1 |
| Lubricating oil viscosity η | 5.97 mPa · S |

The minimum width Wmin of the thrust bearing gap is set to 0.05 μm.

Figure 7:
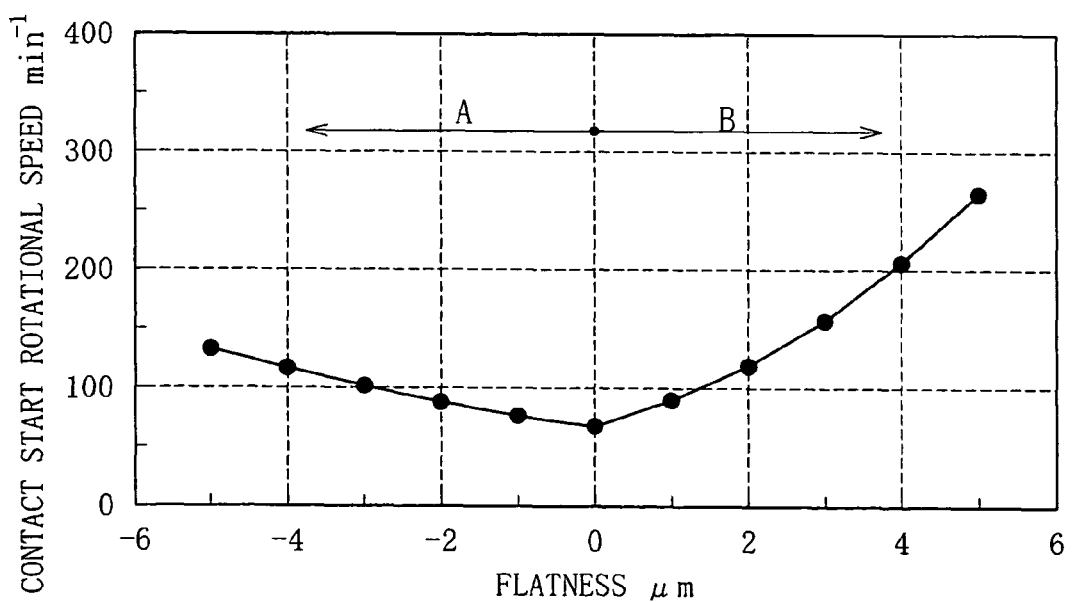
FIG. 7 is a diagram showing the result of a theoretical calculation of a contact start rotational speed.

The result of the theoretical calculation based on the above-described conditions is shown in FIG. 7. The "flatness" on the abscissa axis in FIG. 7 indicates a height h of the inclined plane 17 shown in FIGS. 4 and 5.

As can be seen from the drawing, the dynamic bearing device A according to the present invention including the reduced portion 15 has a lower contact start rotational speed than that of the comparative product B including the expanded portion 15'. Therefore, it is found that the dynamic bearing device A according to the present invention is effective for reducing the contact time between the thrust bearing surface 11a and the thrust receiving surface 11b immediately after the start or immediately before the stop of the motor operation. Moreover, from the result shown in FIG. 7, if the flatness of the thrust bearing surface 11a (the height h of the inclined plane 17) is too high, the contact start rotational speed is correspondingly increased to disadvantageously reduce the dynamic pressure effects. Therefore, it is considered the flatness h has an upper limit. As the result of examination by the inventors of the present invention from this point of view, it is found that the contact start rotational speed is remarkably increased if a ratio of the height h of the inclined plane 17 to its radius r (h/r) exceeds 0.01. Therefore, it is desirable that a value of h/r be 0.01 (θ≈0.6°) or less, more desirably, 0.005 (θ≈0.3°) or less.

Figure 8:
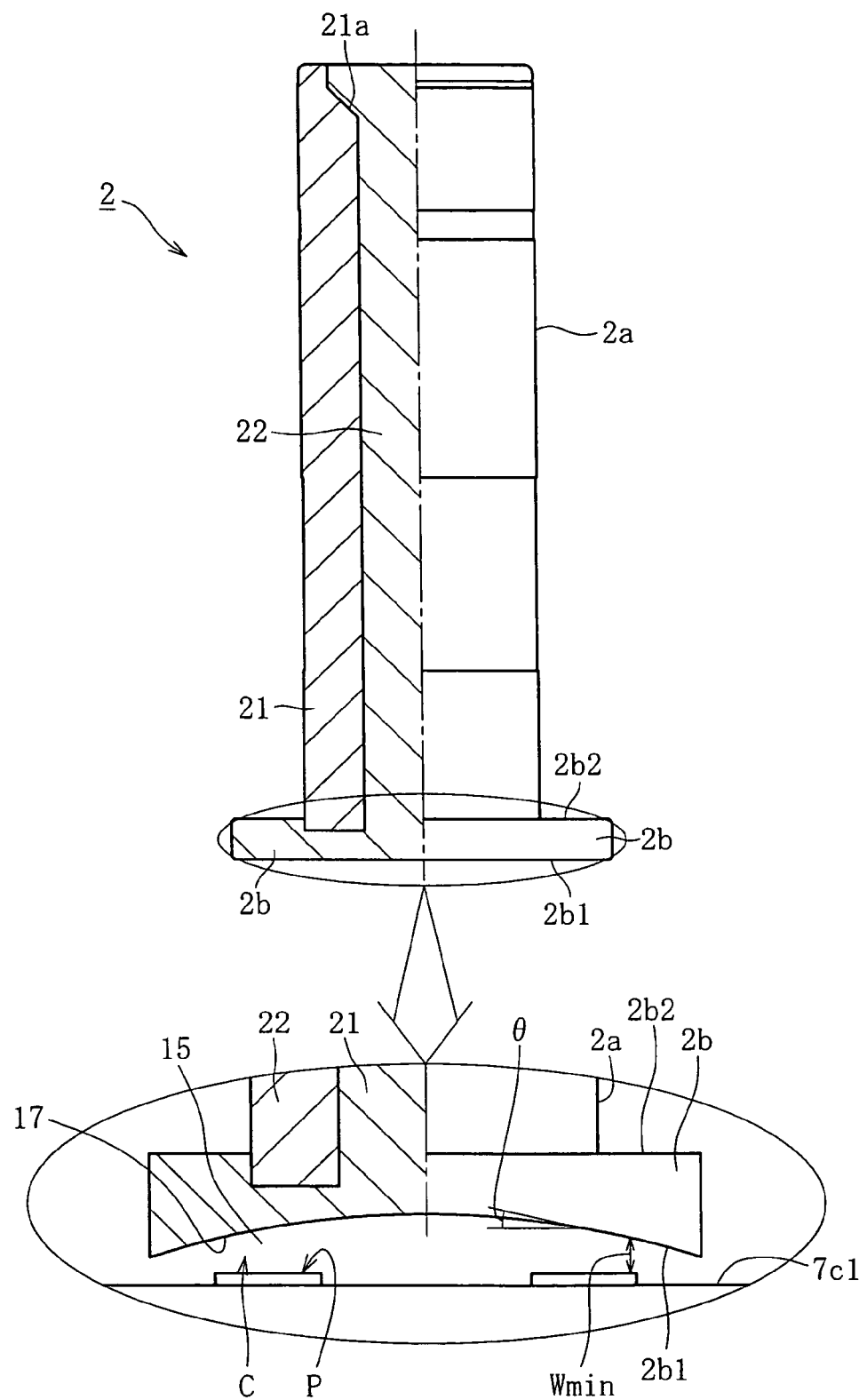
FIG. 8 shows a cross-sectional view of a shaft member and an enlarged view of a principal part thereof.

FIG. 8 shows another embodiment of the present invention. In this embodiment, the shaft member 2 has a composite structure made of a resin and a metal. The resin part includes an inner shaft portion 22 extending in the axial direction and the flange portion 2b extending in the radially outward direction from the inner shaft portion 22, which are integrally formed. An outer shaft portion 22 covering the outer periphery of the inner shaft portion 22 is made of a metal material, for example, stainless steel excellent in wear resistance in a cylindrical hollow shape. It is possible to use PEEK, PPS, LCP, 9T nylon or the like as a resin material. A filler, such as a glass fiber, a carbon fiber or an electric conducting agent, is blended with the above-described base resin above as needed. In the case where the carbon fiber is used, in particular, it is preferred to blend a PAN carbon fiber having a mean fiber diameter of 1 to 12 μm and a mean fiber length of 100 to 500 μm at a blending rate of 5 to 30 vol % with the base resin.

In order to prevent the outer shaft portion 21 made of the metal material and the inner shaft portion 22 and the flange portion 2b made of the resin material from being separated from each other, an end portion 21a is embedded into the flange portion 2b at the lower end of the outer shaft portion 21, whereas an upper end of the outer shaft portion 21 is engaged with the inner shaft portion 22 in the axial direction through, for example, an engaging portion formed by a tapered plane or the like. It is desirable to provide convex and concave portions, which are engageable with the inner shaft portion 22 or the flange portion 2b in the peripheral direction, on the inner peripheral face of the outer shaft portion 21 or the outer peripheral face of the outer shaft portion 21 embedded into the flange portion 2b so that the outer shaft portion 21 does not rotate.

In the present invention, as shown in an enlarged manner in FIG. 8, the curved inclined plane 17 coming closer to an opposed face (the upper end face 7c1 of the thrust plate 7c in this embodiment) in the radially outward direction is provided on the lower end face 2b1 of the flange portion 2b. By forming the inclined plane 17 in this manner, the reduced portion 15 having the axial width (the gap width) decreasing in the radially outward direction is formed in the thrust bearing gap C between the dynamic pressure generating groove area P and the inclined plane 17. The radially outermost portion corresponds to the minimum width portion Wmin of the thrust bearing gap C. Since the peripheral speed of the minimum width portion becomes the highest in the thrust bearing gap C during the rotation of the shaft member 2, the pumping power generated in the dynamic pressure generating groove area P becomes high as described above so that the maximum pumping power can be obtained in the radially outermost portion of the reduced portion 15. As a result, the contact start rotational speed of the bearing device 1 can be kept low so that the wear of the thrust bearing portion T1 due to sliding contact between the end face 2b1 of the flange portion 2b and the upper end face 7c1 of the thrust plate 7c can be prevented. Therefore, high durability can be ensured even in uses where the operation of the motor is frequently started and stopped.

A method of forming the inclined plane 17 is arbitrary. Besides the formation by post-processing such as polishing, the inclined plane 17 can also be formed simultaneously with injection molding of the resin part such as the flange portion 2b or the inner shaft portion 22 by providing an inclined part corresponding to the shape of the inclined plane on a mold surface of a mold for forming the resin part.

In particular, if a resin is provided as a core of the shaft portion 2a so as to be integral with the resin of the flange portion 2b as in the case of this embodiment, the lower end face 2b1 of the flange portion 2b has a larger axial thickness of the resin on the radially inner side than that on the radially outer side by the presence of the resin of the inner shaft portion 22. Therefore, a sink in the axial direction generated when the resin is hardened is large on the radially inner side of the lower end face 2b1 while being smaller on the radially outer side. Accordingly, the inclined plane 17 can be formed by making use of a difference in the amount of sink simultaneously with the resin hardening. Since the above-mentioned post-processing or processing of the mold surface is no more needed in this case, further reduction in cost can be achieved. Such effects can be obtained at least in the case where a thickness of the resin on the lower end face 2b1 on the radially inner side is larger than that on the radially outer side. Therefore, in addition to the case where the inner shaft portion 22 made of a resin is formed over the total length of the shaft portion 2a as in the illustrated example, the same effects can also be expected in the case where the inner shaft portion 22 is formed exclusively for a lower part of the shaft portion 2a.

The enlarged view in FIG. 8 exemplifies the case where the lower end face 2b1 of the flange portion 2b is entirely formed as the inclined plane 17. However, the inclined plane 17 is only required to be formed at least on a part facing the thrust bearing gap (a part being opposed to the dynamic pressure generating groove area P) generating a dynamic pressure effect. Therefore, the remaining part may also be formed as, for example, a flat surface without any inclination. Moreover, although the inclined plane 17 is formed to have a curved cross-sectional shape in this enlarged view, the inclined plane 17 may also be formed as a tapered surface having a straight cross section. The curved inclined plane 17 may not only be formed at a single curvature but also be formed as a composite curve having two or more curvatures.

Furthermore, although FIG. 8 illustrates the case where the inclined plane 17 is provided on the lower end face 2b1 of the flange portion 2b, the same inclined plane may also be formed on the upper end face 2b2 constituting the upper thrust bearing portion T2 so that the thrust bearing gap has a decreasing axial width in the radially outward direction. The inclined planes can also be formed both on the lower end face 2b1 and the upper end face 2b2 of the flange portion 2b.

The application of the present invention is not limited to the dynamic bearing device 1 having the thrust bearing portion T1 between the lower end face 2b1 of the flange portion 2b and the bottom portion 7c of the housing 7; the present invention can be widely applied to dynamic bearing devices including a thrust bearing portion constituted by a dynamic pressure bearing in general. For example, the present invention is similarly applicable to the following dynamic bearing device (not shown). One of the thrust bearing surface 11a and the thrust receiving surface 11b of the thrust bearing portion is formed on the end of the housing 7 on the opening side, while the other is formed on an end face of a rotary member (for example, the disk hub 3) being opposed thereto.

Furthermore, the dynamic pressure generating grooves P1 in the dynamic pressure generating groove area P formed on the thrust bearing surface 11a or 13a or the thrust receiving surface 11b or 3b can be arranged not only in a spiral pattern but also in a herringbone pattern.

The case where the dynamic pressure bearing including the dynamic pressure generating grooves is used as each of the radial bearing portions R1 and R2 has been described above.

However, any bearing can be used as the radial bearing portions R1 and R2 as long as it supports the shaft member 2 in the radial direction in a non-contact manner by an oil film of the lubricating oil, formed in the radial bearing gap. For example, in addition to a bearing including an area serving as the radial bearing surface being composed of a plurality of circles (a circular bearing) and a step bearing, a bearing including an area having a perfect circular cross section without any dynamic pressure generating grooves as the radial bearing surface (a cylindrical bearing) can also be used.

The invention claimed is:

1. A dynamic bearing device comprising:
a shaft member having a flange portion;
a member axially opposing the flange portion;
a thrust bearing surface formed on the member axially opposing the flange, the thrust bearing surface including a dynamic pressure generating groove area having a plurality of dynamic pressure generating grooves being arranged thereon;
a thrust receiving surface provided on the flange portion so as to be opposed to the thrust bearing surface in an axial direction; and
a thrust bearing gap formed between the thrust bearing surface and the thrust receiving surface, the thrust bearing gap for generating a pressure by a dynamic pressure effect of a fluid so as to support the shaft member in an axial direction in a non-contact manner by the pressure, wherein
a reduced portion having an axial width decreasing in a radially outward direction is disposed in the thrust bearing gap, the reduced portion being formed by an inclined plane disposed at the thrust bearing surface, the dynamic pressure generating groove area is disposed on the inclined plane, a depth of each groove in the plurality of dynamic pressure generating grooves being constant relative to the inclined plane, and a pumping power of the dynamic pressure generating grooves being maximized in a radially outermost portion of the reduced portion,
the thrust bearing surface has an inner dented portion and an outer dented portion each facing the thrust receiving surface,
the inner dented portion is dented further than the dynamic pressure generating groove area and is disposed in an area radially inward of the dynamic pressure generating groove area,
the outer dented portion is dented further than the dynamic pressure generating groove area and is formed in an area radially outward of the dynamic pressure generating groove area, and
the thrust bearing gap has a uniform portion with a constant width formed on an inner diameter side of the reduced portion, and a highest pressure in the thrust bearing gap is generated in a center of the uniform portion,
each dynamic pressure generating groove of the dynamic pressure generating grooves has a spiral shape, an outer-diameter end and a groove width, and for each dynamic pressure generating groove of the dynamic pressure generating grooves, the groove width increases as the dynamic pressure generating groove extends radially outwardly toward an outer periphery of the thrust bearing surface such that a largest dimension of the groove width is disposed at the outer-diameter end, and wherein
the thrust bearing surface has an inner stepped portion between the inclined plane and the inner dented portion, and an outer stepped portion between the inclined plane and the outer dented portion, a radially outermost portion of the dynamic pressure generating grooves is opened into the outer stepped portion, and a radially innermost portion of the dynamic pressure generating grooves is opened into the inner stepped portion.

2. The dynamic bearing device according to claim 1, wherein a ratio is set such that $h/r \leq 0.01$ where a length of the inclined plane in a radial direction is r and a height of the inclined plane is h.

3. A motor having: the dynamic bearing device according to claim 2, a rotor magnet attached to the rotational-side member; and a stator coil attached to the fixed-side member.

4. A motor having: the dynamic bearing device according to claim 1, a rotor magnet attached to a rotational-side member; and a stator coil attached to a fixed-side member.

5. A dynamic bearing device comprising:
a shaft member having a shaft portion, a longitudinal axis and a flange portion, the flange portion having an end face and an outer peripheral surface;
a bearing sleeve having an inner peripheral surface;
a radial bearing portion defining a radial bearing gap, and being formed between the shaft portion and the bearing sleeve, for generating a pressure by a dynamic pressure effect of a fluid so as to support the shaft member in a radial direction in a non-contact manner by the pressure, and
a thrust bearing portion having an end face and for generating a pressure by a dynamic pressure effect of the fluid in a thrust bearing gap between the end face of the flange portion and the end face of the thrust bearing portion, the end face of the thrust bearing portion being opposed to the end face of the flange portion so as to support the shaft member in an axial direction in a non-contact manner by the pressure, wherein
the end face of the flange portion faces the thrust bearing gap and is formed of a resin, and at least a part of the end face of the flange portion facing the thrust bearing gap is formed as an inclined plane, the inclined plane being inclined so as to approach the opposed end face of the thrust bearing portion in a radially outward direction, and
wherein the shaft member includes an outer shaft portion having an end portion, an outer peripheral face and an inner peripheral face, and an inner shaft portion disposed on an inner periphery of the outer shaft portion,
the outer shaft portion is formed of a metal,
the radial bearing gap is formed between the outer peripheral face of the outer shaft portion and the inner peripheral surface of the bearing sleeve,
the inner shaft portion and the flange portion are integrally formed of the resin, an axial thickness of the resin of the inner shaft portion being thicker than the flange portion on an outer diameter side of the flange portion,
the end portion of the outer shaft portion is embedded into the flange portion, the outer peripheral face of the outer shaft portion being in contact with the resin of the flange portion and the inner peripheral face of the outer shaft portion being in contact with the resin of the inner shaft portion,
the outer peripheral surface of the flange portion is disposed radially farther from the longitudinal axis of the shaft member than the outer peripheral face of the shaft portion.

6. The dynamic bearing device according to claim 5, wherein a ratio is set such that $h/r \leq 0.01$ where a length of the inclined plane in a radial direction is r and a height of the inclined plane is h.

7. A motor having: the dynamic bearing device according to claim 6, a rotor magnet attached to the rotational-side member; and a stator coil attached to the fixed-side member.

8. A motor having: the dynamic bearing device according to claim 5, a rotor magnet attached to a rotational-side member; and a stator coil attached to a fixed-side member.

9. The dynamic bearing device according to claim 5, wherein the inner shaft member extends along substantially the entire length of the outer shaft member.

* * * * *